(12) United States Patent
Ramisch et al.

(10) Patent No.: US 7,591,932 B2
(45) Date of Patent: Sep. 22, 2009

(54) PRESSURE ELECTROLYSER AND CELL FRAME FOR SAID ELECTROLYSER

(75) Inventors: Marko Ramisch, Ottobrunn (DE); Pietro d'Erasmo, Notodden (NO)

(73) Assignee: Hydrogen Technologies, Notodden (NO)

( * ) Notice: Subject to any disclaimer, the term of this patent is extended or adjusted under 35 U.S.C. 154(b) by 251 days.

(21) Appl. No.: 10/539,428

(22) PCT Filed: Dec. 13, 2003

(86) PCT No.: PCT/EP03/14205

§ 371 (c)(1), (2), (4) Date: Jan. 30, 2006

(87) PCT Pub. No.: WO2004/057058

PCT Pub. Date: Jul. 8, 2004

(65) Prior Publication Data

US 2006/0131167 A1 Jun. 22, 2006

(30) Foreign Application Priority Data

Dec. 19, 2003 (DE) ................. 102 59 386

(51) Int. Cl.
*C25B 9/18* (2006.01)
*C25B 9/20* (2006.01)

(52) U.S. Cl. ............... 204/253; 204/252; 204/254; 204/255; 204/257; 204/266

(58) Field of Classification Search ............. 204/252, 204/253, 254, 255, 257, 266; 429/34–39
See application file for complete search history.

(56) References Cited

U.S. PATENT DOCUMENTS

| 4,077,863 A | 3/1978 | Nasser |
| 4,342,460 A * | 8/1982 | Eng ........................... 277/312 |

(Continued)

FOREIGN PATENT DOCUMENTS

DE 25 48 699 C3 5/1977

(Continued)

OTHER PUBLICATIONS

Ganski et al, Translation of DE10216306A1, pp. 8.*

*Primary Examiner*—Bruce F Bell

(57) ABSTRACT

A pressure electrolyzer having an electrolytic cell block that contains a number of electrolytic cells combined to form a stack, each electrolytic cell having an anode and a cathode. The electrolytic cell block has a sealed housing formed by a number of stacked cell frames of the electrolytic cells, the cell frames being composed at least partially of a material that is elastic at least in a longitudinal direction of the electrolytic cell block and seals adjacent cell frames from each other. End plates are provided so as to hold the electrolytic cell block in place between the end plates under compression of the elastic material. Each of the cell frames has a rigid element that runs in a circumferential direction of the frame so as to mechanically stabilize the cell frame. The rigid element being connected with the elastic material and forming a shell-like frame structure, which partially encloses the elastic material so that the elastic material partially protrudes from the rigid element to form a compressible region in the longitudinal direction of the electrolytic cell block. Adjacent cell frames each have projecting parts and recesses that fit into each other for locking the adjacent cell frames in place and/or for sealing the adjacent cell frames.

15 Claims, 4 Drawing Sheets

U.S. PATENT DOCUMENTS

| | | | |
|---|---|---|---|
| 4,748,092 A | | 5/1988 | Hekal |
| 4,915,803 A | | 4/1990 | Morris |
| 5,480,743 A | * | 1/1996 | McCarter et al. .............. 429/96 |
| 6,086,643 A | * | 7/2000 | Clark et al. ................ 29/623.2 |

FOREIGN PATENT DOCUMENTS

| | | |
|---|---|---|
| DE | 10216306 A1 * | 11/2003 |
| EP | 0 995 818 A1 | 4/2000 |
| WO | WO 97/24778 | 7/1997 |

\* cited by examiner

PRESSURE ELECTROLYSER AND CELL FRAME FOR SAID ELECTROLYSER

PRIORITY CLAIM

This is a 35 U.S.C. §371 National Stage of International Application No. PCT/EP2003/014205, filed on Dec. 13, 2003. Priority is claimed on that application and on the following application:
Country: Germany, Application No. 102 59 386.8, Filed: Dec. 19, 2002.

BACKGROUND OF THE INVENTION

The invention concerns a pressure electrolyzer and a cell frame for said electrolyzer.

Pressure electrolyzers for the electrolytic cleavage of water into hydrogen and oxygen are known which have a pressure tank and a block of electrolytic cells, which is arranged in the pressure tank and contains a number of electrolytic cells combined in the form of a stack. Each electrolytic cell contains an anode and a cathode. An electrolytic fluid or electrolyte circulation system serves to supply an anolyte to the anodes and a catholyte to the cathodes. The electrolytic cell block has a sealed housing, by which it is sealed from the interior of the pressure tank. A pressure electrolyzer of this type is described in DE 25 48 699 C3.

Expensive devices that contain spring elements, a support frame, and similar components are usually necessary for tensioning and sealing the individual cells of the electrolytic cell block against one another. The power supply system for the electrolytic cell block has previously consisted of a large number of parts, including a pressure pipe, gaskets, etc.

SUMMARY OF THE INVENTION

The objective of the invention is to create an improved pressure electrolyzer, specifically, a pressure electrolyzer that has a simpler design and is constructed with a smaller number of parts and can thus be manufactured at low cost. A further objective is the creation of a cell frame for the construction of the electrolytic cell block.

These objective are achieved, on the one hand, by a pressure electrolyzer and, on the other hand, by a cell frame for a pressure electrolyzer as will be described below.

The invention creates a pressure electrolyzer with an electrolytic cell block that contains a number of electrolytic cells combined in the form of a stack. Each electrolytic cell contains an anode and a cathode. The electrolytic cell block has a sealed housing. End plates are mounted at the ends of the electrolytic cell block. In accordance with the invention, the housing of the electrolytic cell block is formed by a number of stacked cell frames. The cell frames consist at least partially of a material that is elastic at least in the longitudinal direction and the transverse direction of the electrolytic cell block and seals adjacent cell frames from each other. The electrolytic cell block is held in place between the end plates under compression of the elastic material in the longitudinal direction. An advantage of the pressure electrolyzer of the invention is that thermal expansion of the individual electrolytic cells and thus of the entire electrolytic cell block is compensated by the elastic material provided in the cell frames. On the one hand, this makes it possible to provide the end plates in stationary form in a simplified way, for example, in the form of tank covers of a pressure tank surrounding the electrolytic cell block. On the other hand, additional devices for keeping the electrolytic cell block under a well-defined pretension in all temperature ranges can be dispensed with. In addition, relatively large manufacturing tolerances of the electrolytic cells and the cell frames can be compensated by the elastic material.

Preferably, the cell frames can have a rigid element, which runs in the circumferential direction of the frame for mechanical stabilization of the cell frames and is connected with the elastic material.

In accordance with one embodiment of the invention, the rigid element can form a shell-like frame structure, which partially encloses the elastic material and from which the elastic material partially protrudes to form a compressible region in the longitudinal direction of the electrolytic cell block.

In accordance with another embodiment of the invention, the rigid element can form a frame-like insert that is wholly or partially embedded in the elastic material.

In accordance with a modification of the invention, adjacent cell frames can each have projecting parts and recesses that fit into each other for locking the adjacent cell frames in place and/or for sealing the adjacent cell frames.

In accordance with a preferred embodiment of the invention, each anode can have its own anode cell frame, and each cathode can have its own cathode cell frame.

The elastic material can consist of an elastomer or a soft elastic thermoplastic.

The rigid element can consist of a dimensionally stable material, especially a metal or a plastic.

The rigid element that forms the shell-like frame structure can consist of an electrically insulating material, especially plastic.

In addition, the invention creates a cell frame for a pressure electrolyzer with the aforementioned features.

Specific embodiments of the invention are explained below with reference to the drawings.

DETAILED DESCRIPTION OF THE INVENTION

Figure 1:
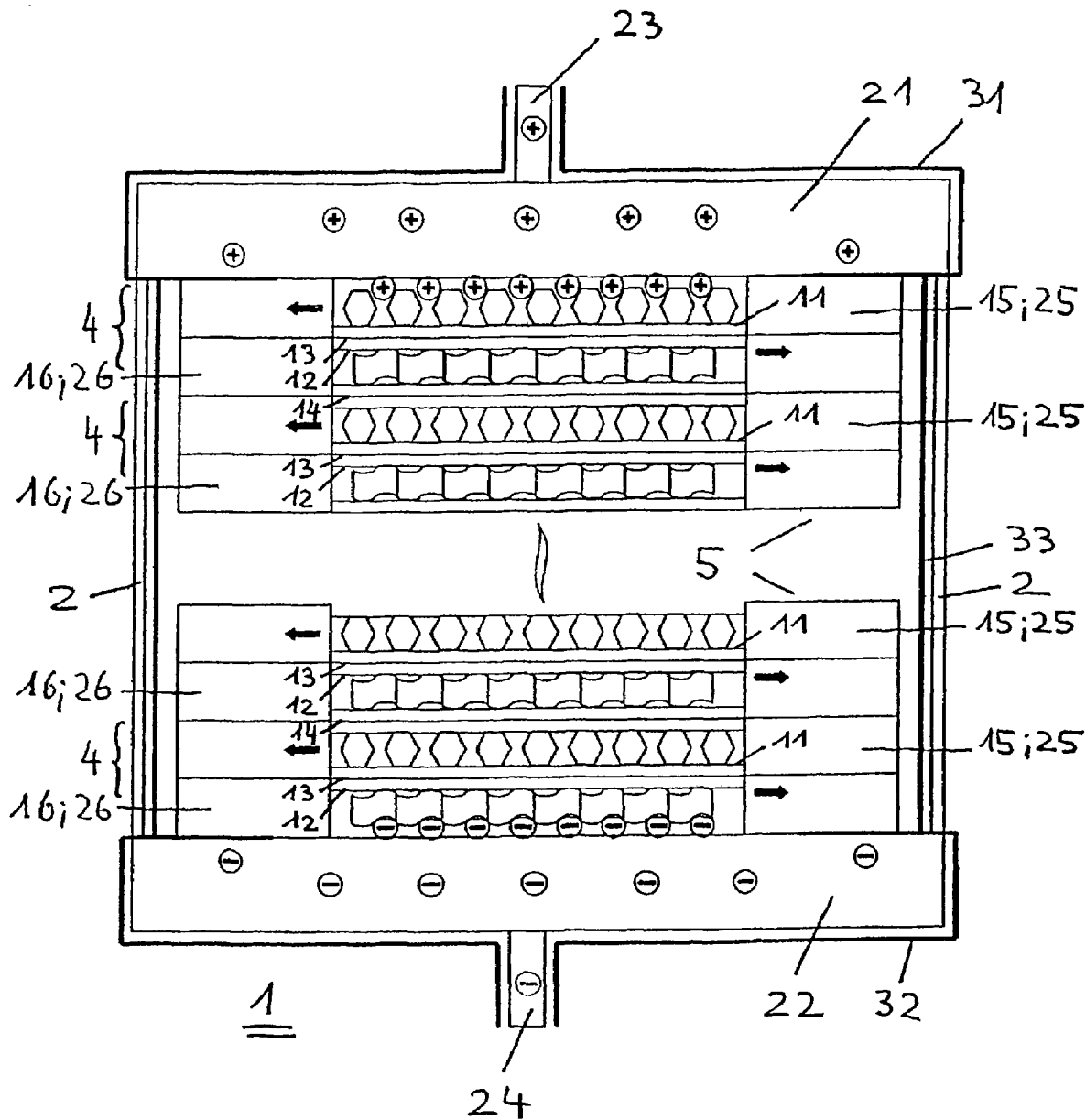
FIG. 1 shows a schematic cutaway top view of a pressure electrolyzer in accordance with one embodiment of the invention.

FIG. 1 shows a pressure electrolyzer, which is labeled as a whole by reference number 1, and in which an electrolytic cell block 3 is mounted in a pressure tank 2. The electrolytic cell block 3 consists of a number of electrolytic cells 4 arranged in a stack. Each electrolytic cell comprises an anode 11 and a cathode 12, which are separated from each other by a diaphragm 13 arranged between them. Between two adjacent electrolytic cells 4, there is a bipolar separator 14, by which the anode compartment of one electrolytic cell 4 is separated from the cathode compartment of the adjacent electrolytic cell 4, while at the same time electrical contact between the two is maintained. End plates 21, 22 are provided at the ends of the electrolytic cell block 3, namely, an end plate 21 at the anode end and an end plate 22 at the cathode end. The end plates 21, 22 hold the electrolytic cell block 3 in its longitudinal direction under mechanical pretensioning with the individual electrolytic cells 4 sealed from one another. In addition, the end plates 21, 22 form the terminal seal of the pressure tank 2. Finally, the end plates 21, 22 serve to supply electric power to the electrolytic cell block 3. The power is supplied through a power supply line 23 at the anode end and a power supply line 24 at the cathode end. Electrical insulation 31, 32, 33 is arranged on the end plates 21, 22 and on the inside of the pressure tank 2. The housing 5 of the electrolytic cell block 3 is formed by a number of stacked cell frames 15, 16; 25, 26 of the electrolytic cells 4. In the embodiment shown in FIG. 1, each anode 11 is provided with its own adjacent anode cell frame 15; 25, and each cathode 12 is provided with its own adjacent cathode cell frame 16; 26.

Figure 2:
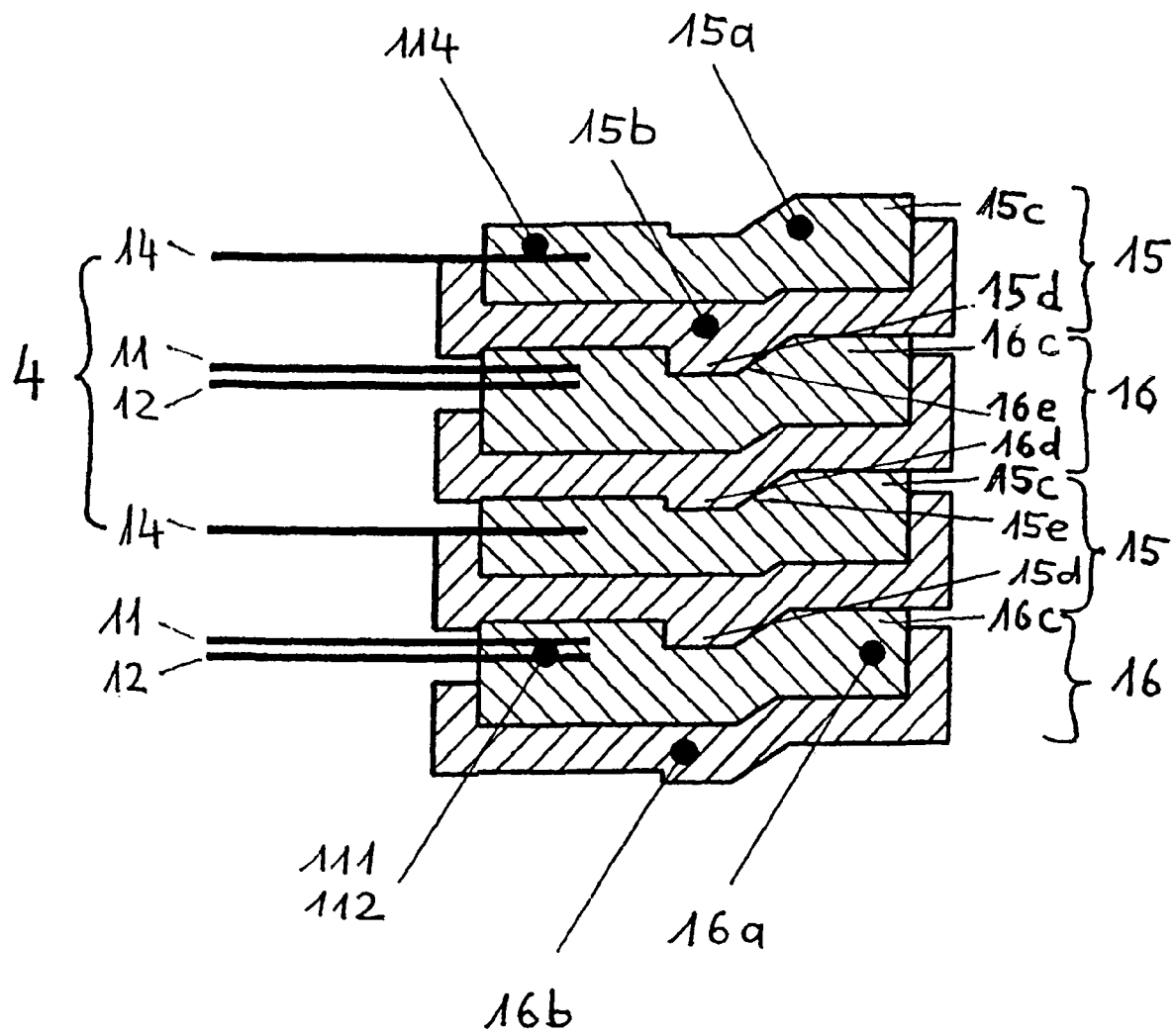
FIG. 2 shows an enlarged cutaway view of a portion of the cell frames of the electrolytic cells, which simultaneously form a sealed housing of the electrolytic cell block in accordance with one embodiment of the invention.
Figure 3:
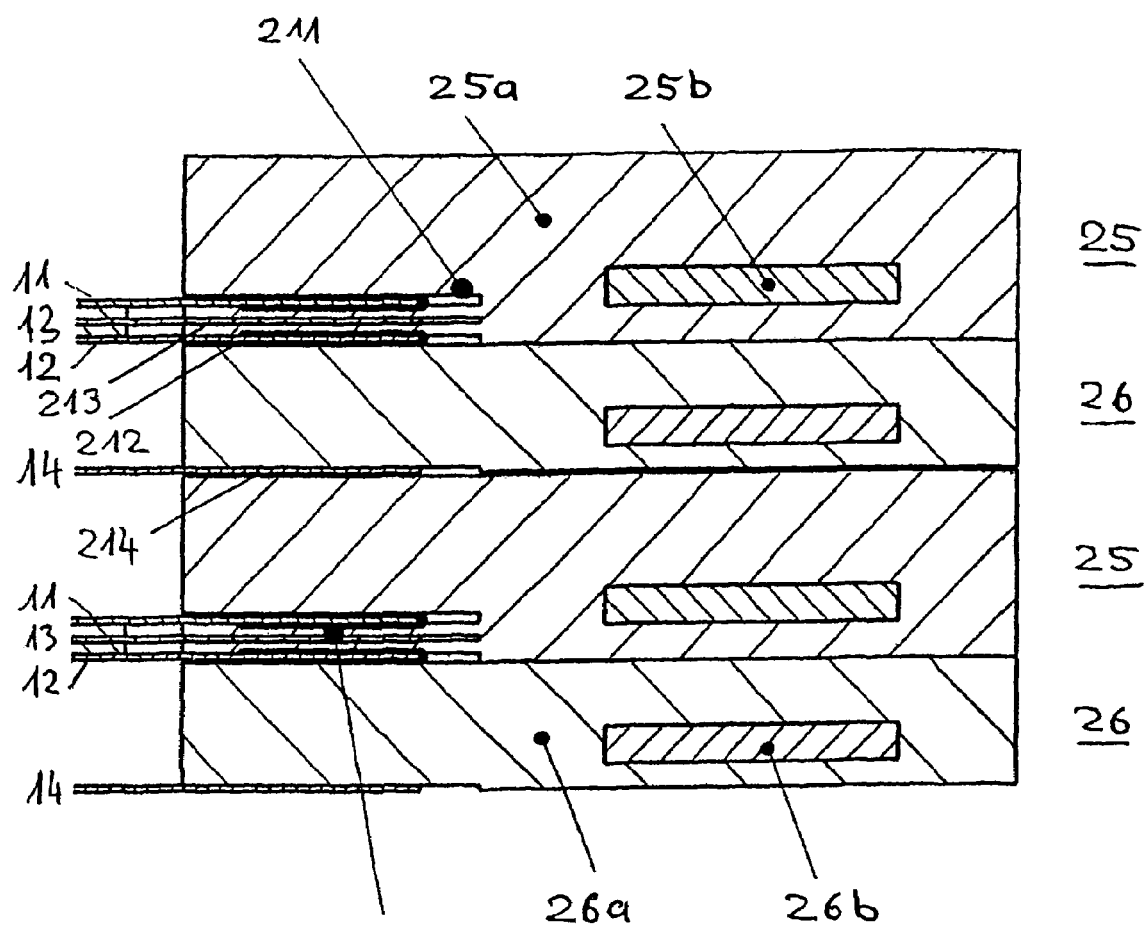
FIG. 3 shows a cutaway view, similar to FIG. 3, of another embodiment of the invention.

As is shown in FIGS. 2 and 3, which represent two different embodiments of the cell frames 15, 16 and 25, 26, respectively, the cell frames 15, 16; 25, 26 consist at least partially of an elastic material 15a, 16a and 25a, 26a, respectively, which is elastic at least in the longitudinal direction and the transverse direction of the electrolytic cell block 3. This elastic material 15a, 16a and 25a, 26a, respectively, seals adjacent cell frames 15, 16 and 25, 26, respectively, from each other, and the elastic material 15a, 16a and 25a, 26a, respectively, is compressed in the longitudinal direction, which causes the electrolytic cell block 3 to be held in place between the end plates 21, 22, as FIG. 1 shows. Besides sealing adjacent cell frames 15, 16 and 25, 26, respectively, from each other, the compressibility of the elastic material 15a, 16a and 25a, 26a, respectively, compensates thermal expansion or contraction during the startup, operation and shutdown of the pressure electrolyzer and also compensates dimensional tolerances of the individual cell frames 15, 16 and 25, 26, respectively. The cell frames 15, 16 and 25, 26, respectively, additionally comprise a rigid element 15b, 16b and 25b, 26b, respectively, which runs in the circumferential direction of the frame, mechanically stabilizes the cell frames 15, 16 and 25, 26, respectively, and is connected with the elastic material 15a, 16a and 25a, 26a, respectively.

In the embodiment illustrated in FIG. 2, the rigid element 15b, 16b forms a shell-like frame structure, which partially encloses the elastic material 15a, 16a and from which the elastic material 15a, 16a partially protrudes to form a compressible region 15c, 16c in the longitudinal direction of the electrolytic cell block 3. The elastic material 15a, 16a can thus be placed under compression between the rigid element 15b, 16b in which it is embedded and the rigid element 15b, 16b of the adjacent cell frame 15, 16, so that it can carry out the aforementioned functions of sealing adjacent cell frames 15, 16 and compensating thermal expansion.

In the embodiment illustrated in FIG. 3, the rigid element 25b, 26b forms a frame-like insert that is embedded in the elastic material 25a, 26a of the respective cell frame 25 and 26.

As FIG. 2 shows, the adjacent cell frames 15, 16 have projecting parts 15d, 16d and recesses 15e, 16e that fit into each other and serve to lock the adjacent cell frames 15, 16 in place and/or seal the adjacent cell frames 15, 16. For example, cell frame 15, specifically, its shell-like rigid element 15b, has a projection 15d, which fits into a recess 16e of the adjacent cell frame 16, specifically, a recess 16e in the elastic material 16a of the adjacent cell frame 16. Similarly, cell frame 16, specifically, its shell-like rigid element 16b, has a projection 16d, which fits into a recess 15e of the following adjacent cell frame 15, specifically, a recess 15e in the elastic material 15a of the adjacent cell frame 15.

In both of the embodiments shown in FIGS. 2 and 3, each anode 11 is assigned its own anode cell frame 15 and 25, respectively, and each cathode 12 is assigned its own cathode cell frame 16 and 26, respectively.

In the embodiment shown in FIG. 2, peripheral slits 111, 112, which receive the anode 11 and the cathode 12, respectively, are formed in the elastic material 16a of cell frame 16, which in the present case is referred to as the cathode cell frame. A peripheral slit 114, which receives the bipolar separator 14, is formed in the elastic material 15a of cell frame 15, which in the present case is referred to as the anode cell frame. Although the slits 111, 112 are thus provided for both the anode 11 and the cathode 12 in the elastic material 16a of the cathode cell frame 16, cell frame 15 should be regarded as assigned to the anode, and cell frame 16 should be regarded as assigned to the cathode, which is repeated for each electrolytic cell 4. The peripheral slits 111, 112, 114 in the elastic material 15a and 16a allow dimensionally stable, tight and positionally stable holding of the anode 11, cathode 12 and bipolar collector 14 without any additional measures. This also applies to a diaphragm contained in the electrolytic cells. For the sake of simplicity, however, the diaphragm is not shown in FIG. 2.

In the embodiment shown in FIG. 3, peripheral slits 211 and 213, which receive the anode 11 and the diaphragm 13, respectively, are again formed in the elastic material 25a of cell frame 25, which is referred to here as the anode cell frame. In contrast to FIG. 2, in FIG. 3 the diaphragm 13 is explicitly shown. In addition, a peripheral recess 212, which receives the cathode 12, is formed on the side of the elastic material 25a that faces the elastic material 26a of the adjacent cell frame 26a. The elastic material 26a of the adjacent cell frame 26, which is referred to here as the cathode cell frame, contains a recess 214 for receiving the bipolar separator 14 on its side facing the cell frame 25 of the following electrolytic cell 4. Here again, the anode 11 and the cathode 12 each has its own cell frame, namely, anode cell frame 25 and cathode cell frame 26, which is repeated for each electrolytic cell. The peripheral slits 211, 213 and the peripheral recesses 212, 214 allow the respective elements, namely the anode 11, the diaphragm 13, the cathode 12 and the bipolar separator 14, to be held in the cell frames 25, 26 in a dimensionally stable, tight and positionally stable way, so that no additional measures are required for this.

The elastic materials 15a, 16a and 25a, 26a of the respective cell frames 15, 16 and 25, 26 can consist of an elastomer or a soft elastic thermoplastic.

The rigid elements 15b, 16b and 25b, 26b of the respective cell frames 15, 16 and 25, 25 can consist of a dimensionally stable material, especially a metal, another suitable metal, or a plastic.

In the embodiment shown in FIG. 2, the rigid element 15b, 16b that forms the shell-like frame structure consists especially of an electrically insulating material, especially plastic.

The surfaces of the components of the cell frames 15, 16 and 25, 26 that are continually acted upon by the gas-containing media present in the pressure electrolyzer 1 can be sheathed in a suitable coating, e.g., PTFE, as additional protection and as a means of reducing flammability.

The shape of the cell frames 15, 16 and 25, 26 can be adapted to the interior of the pressure tank 2 in such a way that they not only fulfill their function of forming the housing 5 of the electrolytic cell block 3 but also serve as a support structure for the electrolytic cell block 3.

Figure 4:
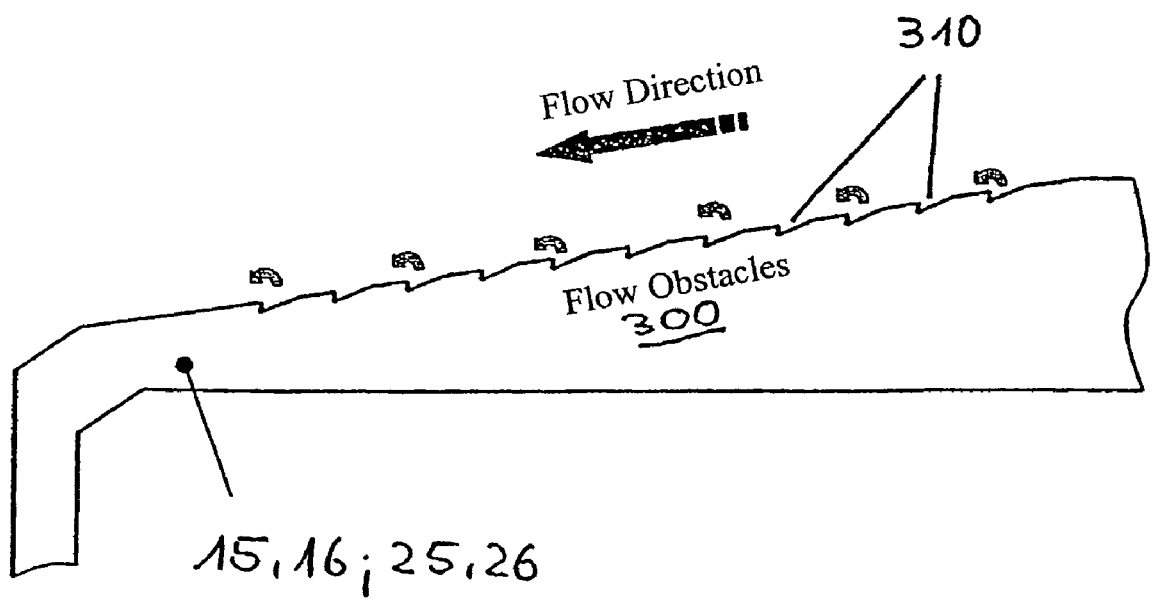
FIG. 4 shows a detail view of a cell frame in accordance with another embodiment of the invention.

As FIG. 4 shows, flow obstacles 300 formed by serrations 310 can be provided on the upper surface of the upper frame pieces of the cell frames 15, 16 and 25, 26 to improve the gas separation effect.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

The invention claimed is:

1. A pressure electrolyzer, comprising an electrolytic cell block that contains a number of electrolytic cells combined to form a stack, each electrolytic cell having an anode and a cathode, and the electrolytic cell block having a sealed housing formed by a number of stacked cell frames of the electrolytic cells, the cell frames being composed at least partially of a material that is elastic at least in a longitudinal direction of the electrolytic cell block and seals adjacent cell frames from each other, end plates being provided so as to hold the electrolytic cell block in place between the end plates under compression of the elastic material, each of the cell frames having a rigid element that runs in a circumferential direction of the frame so as to mechanically stabilize the cell frame, the rigid element being connected with the elastic material, the rigid element forming a shell-like frame structure, which partially encloses the elastic material so that the elastic material partially protrudes from the rigid element to form a compressible region in the longitudinal direction of the electrolytic cell block, adjacent cell frames each having projecting parts and recesses that fit into each other for locking the adjacent cell frames in place and/or for sealing the adjacent cell frames.

2. The pressure electrolyzer in accordance with claim 1, wherein each anode has its own anode cell frame, and each cathode has its own cathode cell frame.

3. The pressure electrolyzer in accordance with claim 1, wherein the elastic material is an elastomer or a soft elastic thermoplastic.

4. The pressure electrolyzer in accordance with claim 1, wherein the rigid element is made of a dimensionally stable material.

5. The pressure electrolyzer in accordance with claim 4, wherein the rigid element is made of metal or plastic.

6. The pressure electrolyzer in accordance with claim 1, wherein the rigid element is made of a dimensionally stable material.

7. The pressure electrolyzer in accordance with claim 6, wherein the rigid element is made of metal or plastic.

8. The pressure electrolyzer in accordance with claim 1, wherein the rigid element that forms the shell-like frame structure is made of an electrically insulating material.

9. The pressure electrolyzer in accordance with claim 8, wherein the rigid element is made of plastic.

10. The pressure electrolyzer in accordance with claim 1, wherein the end plates are configured to form a power supply to ends of the electrolytic cell block (3).

11. A pressure electrolyzer, comprising an electrolytic cell block that contains a number of electrolytic cells combined to form a stack, each electrolytic cell having an anode and a cathode, the electrolytic cell block having a sealed housing formed by a number of stacked cell frames of the electrolytic cells, the cell frames being composed at least partially of a material that is elastic at least in a longitudinal direction of the electrolytic cell block and seals adjacent cell frames from each other, end plates being provided so as to hold the electrolytic cell block in place between the end plates under compression of the elastic material, each of the cell frames having a rigid element that runs in a circumferential direction of the frame so as to mechanically stabilize the cell frames, the rigid element being connected with the elastic material, the rigid element forming a frame-like insert that is at least partially embedded in the elastic material, adjacent cell frames each having projecting parts and recesses that fit into each other for locking the adjacent cell frames in place and/or for sealing the adjacent cell frames.

12. The pressure electrolyzer in accordance with claim 11, wherein the rigid element is completely embedded in the elastic material.

13. The pressure electrolyzer in accordance with claim 11, wherein each anode has its own anode cell frame, and each cathode has its own cathode cell frame.

14. The pressure electrolyzer in accordance with claim 11, wherein the elastic material is an elastomer or a soft elastic thermoplastic.

15. The pressure electrolyzer in accordance with claim 11, wherein the end plates are configured to form a power supply to ends of the electrolytic cell block (3).

* * * * *